United States Patent
Baker et al.

(10) Patent No.: US 8,472,938 B2
(45) Date of Patent: Jun. 25, 2013

(54) RADIO COMMUNICATION STATION AND RADIO COMMUNICATION DEVICE, AND METHODS OF OPERATING SAME

(75) Inventors: Matthew P. J. Baker, Canterbury (GB); Timothy J. Moulsley, Caterham (GB); Filippo Tosato, Redhill (GB); Domenico Porcino, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 600 days.

(21) Appl. No.: 12/376,581

(22) PCT Filed: Aug. 8, 2007
(Under 37 CFR 1.47)

(86) PCT No.: PCT/IB2007/053145
§ 371 (c)(1),
(2), (4) Date: Apr. 29, 2010

(87) PCT Pub. No.: WO2008/018039
PCT Pub. Date: Feb. 14, 2008

(65) Prior Publication Data
US 2011/0039535 A1    Feb. 17, 2011

(30) Foreign Application Priority Data
Aug. 9, 2006   (EP) ..................... 06118696

(51) Int. Cl.
*H04W 88/02*    (2009.01)
(52) U.S. Cl.
USPC .................... 455/422.1; 455/435.2
(58) Field of Classification Search
USPC ............ 455/422.1, 435.2, 7, 130, 435, 456.1, 455/511, 522, 524, 452.1; 370/345, 328, 370/336; 375/259
See application file for complete search history.

(56) References Cited

U.S. PATENT DOCUMENTS

2008/0273624 A1*  11/2008  Kent et al. ............... 375/296
2011/0211656 A1*  9/2011   Kent et al. ............... 375/296

FOREIGN PATENT DOCUMENTS

JP    2008526125 A    7/2008

OTHER PUBLICATIONS

NTT-Docomo, Fujitsu, NEC, Sharp, Toshiba: "Non-synchronized Random Access Procedure for E-UTRA Uplink" 3GPP RAN WG1 LTE AD HOC: RI-061660, [Online] Jun. 27, 2006-Jun. 30, 2006, pp. 1-6, XP002467017 Retrieved from the Internet: URL:www.3gpp.org.
Masson Romain: "XR-EE-KT-2006_002: E-UTRA RÄCH within the LTE system" Internet Citation, [Online] Feb. 3, 2006, XP002456636 Retrieved from the Internet: URL :http://www.ee.kth.se/php/modules/publications/reports/2006/.
Philips: "Effect of CQI Quantization on räch Collision Probabilities" 3GPP TSG-RAN WG2 #55: R2-062938, [Online] Oct. 9, 2006-Oct. 13, 2006, pp. 1-9, XP002467018 Retrieved from the Internet: URL:www.3gpp.org>.

* cited by examiner

Primary Examiner — Diane Mizrahi

(57) ABSTRACT

A radio communication station in a radio communication system having a plurality of radio communication devices, derives a quantization parameter and transmits the quantization parameter to the radio communication devices for use in subsequent quantization of a channel state metric. The radio communication devices receive the quantization parameter, determine a channel state metric, quantize the determined channel state metric by applying quantization ranges indicated by the quantization parameter, determine a data value indicative of the quantized channel state metric, and transmit a signal conveying the determined data value as a random access transmission.

7 Claims, 2 Drawing Sheets

| Signalled value | CQI/dB according to uniform quantisation | CQI / dB according to the invention |
|---|---|---|
| 1 | 0-3.8 | 0-10.4 |
| 2 | 3.8-7.5 | 10.4-12.3 |
| 3 | 7.5-11.3 | 12.3-13.7 |
| 4 | 11.3-15.0 | 13.7-15.0 |
| 5 | 15.0-18.8 | 15.0-16.3 |
| 6 | 18.8-22.5 | 16.3-17.7 |
| 7 | 22.5-26.3 | 17.7-19.6 |
| 8 | 26.3-30 | 19.6-30 |

RADIO COMMUNICATION STATION AND RADIO COMMUNICATION DEVICE, AND METHODS OF OPERATING SAME

TECHNICAL FIELD

The invention relates to a radio communication apparatus and to a method of operating a radio communication apparatus. The invention has application in, for example but not exclusively, mobile communication systems.

BACKGROUND ART

Mobile communication systems typically incorporate mechanisms to transmit information about the state of a radio channel. For example, channel state information can be sent as part of the random access mechanism by which mobile terminals can access a network. In one example of a random access mechanism which is under consideration for the UMTS LTE (Universal Mobile Telecommunication System Long Term Evolution) a mobile terminal transmits a signature on an asynchronous random access channel (RACH). The mobile terminal selects a particular signature from a larger set (e.g. of 64), which enables a few bits (e.g. 6) of information to be conveyed. One requirement is that the collision probability (i.e. probability that two mobile terminals use the same signature at the same time) should be sufficiently low. A further requirement is that the resulting waveforms have low cross-correlation.

The bit pattern defining the signature can be considered in terms of one or more data fields. Some examples of the potential contents of the data fields are:
  Pseudo-random data (in the form of a temporary mobile terminal identity to reduce the risk of collision)
  Channel quality indicator (CQI) or pathloss measurement
  Reason for RACH access
The CQI and Reason fields may also help to reduce collisions if they are sufficiently uncorrelated between terminals.

The example mechanism described above suffers from competing problems of the limited number of useful data bits which can be sent, and the potential collision probability.

DISCLOSURE OF INVENTION

An object of the invention is to enable an improved random access mechanism.

According to a first aspect of the invention there is provided a method of operating a radio communication station in a radio communication system having a plurality of radio communication devices, comprising deriving a quantisation parameter and transmitting the quantisation parameter to the radio communication devices for use in subsequent quantisation of a channel state metric.

According to a second aspect of the invention there is provided a method of operating a radio communication device, comprising: receiving a quantisation parameter; determining a channel state metric; quantising the determined channel state metric by applying quantisation ranges indicated by the quantisation parameter; determining a data value indicative of the quantised channel state metric; and transmitting a signal conveying the determined data value as a random access transmission.

The invention also provides a method of operating a communication system comprising operating a radio communication station in accordance with the first aspect of the invention and operating a radio communication device in accordance with the second aspect of the invention.

According to a third aspect of the invention there is provided a radio communication station for use in a radio communication system having a plurality of radio communication devices, comprising means adapted to derive a quantisation parameter and means adapted to transmit the quantisation parameter to the radio communication devices for use in subsequent quantisation of a channel state metric.

According to a fourth aspect of the invention there is provided a radio communication device, comprising: means adapted to receive a quantisation parameter; means adapted to determine a channel state metric; means adapted to quantise the determined channel state metric by applying quantisation ranges indicated by the quantisation parameter; means adapted to determine a data value indicative of the quantised channel state metric; and means adapted to transmit a signal conveying the determined data value as a random access transmission.

The invention also provides a communication system comprising a radio communication station in accordance with the third aspect of the invention and a radio communication device in accordance with the fourth aspect of the invention.

Depending on the probability density function (PDF) of channel state metric values, and consequently of the data values, the collision probability may be higher than if random data alone was transmitted. In contrast to the invention, a fixed quantisation algorithm for quantising the data bits does not adapt to changes in the distribution of measured channel state metric values, and may therefore result in a high collision probability if a significant proportion of the mobile terminals measure substantially-similar values. The present invention alleviates this problem by enabling the quantisation algorithm to be adapted.

The quantisation parameter may be derived dependent on a characteristic of the radio communication system. This enables the radio communication station to adapt the quantisation parameter to time-varying system characteristics.

The characteristic of the radio communication system may be derived from signals received on a random access channel from a plurality of radio communication devices. This enables the radio communication station to adapt the quantisation parameter to, for example, the activity level and signal quality of the radio communication devices.

The signals received on the random access channel from the plurality of radio communication devices, may each convey a data value indicative of a quantised channel state metric of the respective radio communication device, and the radio communication station may derive the quantisation parameter dependent on the data values. This enables the radio communication station to adapt the quantisation parameter to the channel state metrics. Different sets of data values may be conveyed by different time and/or frequency resource slots.

The radio communication station may derive the quantisation parameter dependent, for example, on the frequency of occurrence of different data values. This enables the radio communication station to adapt the quantisation parameter to control the number of collisions of the signals transmitted by the radio communication devices. In particular the quantisation parameter may be adjusted to reduce the frequency of occurrence of the most frequently occurring data values, thereby reducing the number of collisions.

The quantisation parameter may be indicative of quantisation ranges at least some of which have unequal width. This also enables the number of collisions to be controlled.

Different data values may be conveyed by different time and/or frequency resource slots. The different resource slots may correspond to quantisation ranges having different widths. These features also enable the number of collisions to be controlled.

The channel state metric may be indicative of one or more of:
channel quality indicator for a received signal;
channel transfer function;
channel quality indicators for more than one frequency or frequency band;
channel quality indicators for more than one antenna;
average value of a channel quality indicators for more than one antenna;
difference between channel quality indicators for more than one antenna;
location of the radio communication device;
angle of a receive path;
requested data rate.

A channel quality indicator may, for example, comprise one or more of:
a signal to noise ratio;
a signal to interference ratio;
a receivable data rate;
a path loss.

BRIEF DESCRIPTION OF DRAWINGS

The invention will now be described, by way of example only, with reference to the accompanying drawings wherein.

MODES FOR CARRYING OUT THE INVENTION

Embodiments of the invention will be described with reference to a mobile communication system in which the radio communication device may be a mobile terminal, such as a mobile phone, and the radio communication station may be a base station in a network.

According to the invention, at least one quantisation parameter for quantising data to be transmitted in a random access preamble is signalled to a mobile terminal. When the mobile terminal quantises data in accordance with the signalled parameter(s), the probability of occurrence of each of the data values that can be signalled in the preamble can be made more similar.

In general, according to the invention at least part of the data transmitted in the preamble signature would typically be non-uniformly quantised. The non-uniform quantisation would be designed to give a more uniform distribution of transmitted data values than would be the case with a uniform quantisation, based on an assumed or estimated PDF of the data to be transmitted. This reduces the risk of signature collisions between the RACH attempts of different mobile terminals. This improvement is accompanied by a reduction in the resolution of the transmitted data around the least-probable ranges of values.

In a simple embodiment, the signalled quantisation parameter may comprise the highest and lowest quantisation levels to be used. This would indicate that all measured values above the highest quantisation level or below the lowest quantisation level would be sent with the highest or lowest data value respectively.

Quantisation in the region between the highest and lowest levels could be carried out using a predetermined granularity, for example determined by the number of bits available for data transmission.

Figures 1, 2:
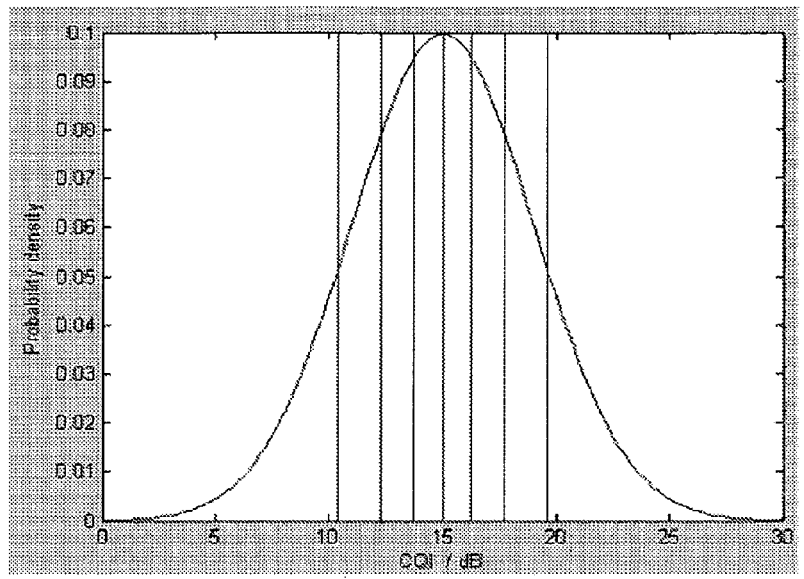
FIG. 1 is an example PDF of CQI values and ideal quantisation thresholds for maximum randomisation of transmitted values.
FIG. 2 is a table of example quantisation ranges and corresponding data values.

For example, FIG. 1 shows an example of a PDF of CQI values which may, for example, be assumed to follow a log-normal distribution. In this case, the quantisation thresholds for mapping CQI values to data bits to be transmitted in the preamble are ideally selected so as to give a substantially uniform distribution of the data bits to be transmitted. FIG. 1 shows where the quantisation levels would be placed following this ideal assumption; the mapping shown in FIG. 2 would be used between the CQI value in dB and the signalled data bits, for a case when 3 bits are used to represent CQI in the preamble signature.

It can be seen from FIG. 1 that the quantisation thresholds are substantially evenly-spaced within a limited range of the full set of values.

An approximation to this quantisation pattern is to apply evenly-spaced thresholds between the highest and lowest thresholds. For example, in the simple embodiment described above, highest and lowest thresholds of 19.5 dB and 10.5 dB respectively would be signalled to the mobile terminals.

Figure 3:
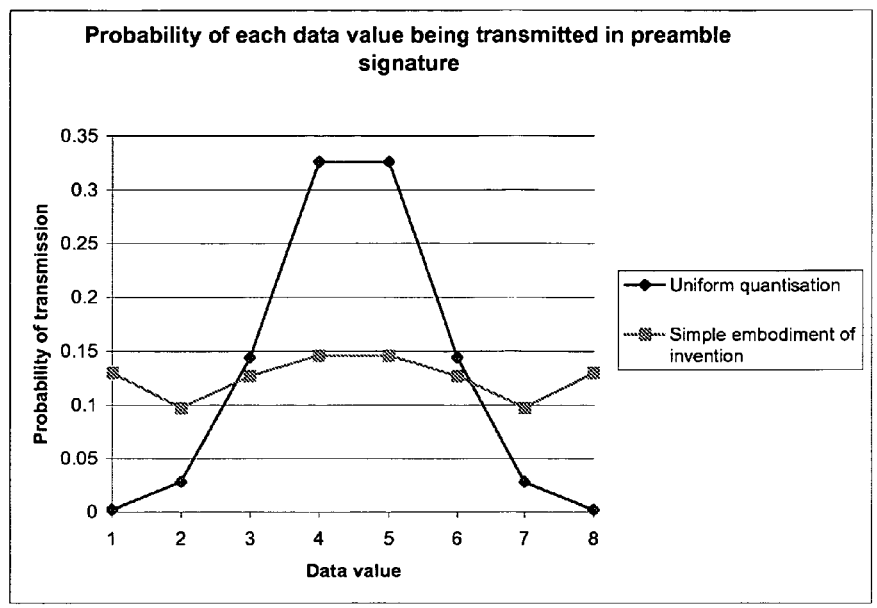
FIG. 3 is an example PDF for unequal quantisation ranges.

Knowing the number of bits available for data reporting (in this example 3), and hence the fact that 8 data values are available, the mobile terminal can then position equidistantly intermediate thresholds at 12 dB, 13.5 dB, 15 dB, 16.5 dB and 18 dB. This results in the probabilities of transmission of each of the available data values being as shown in FIG. 3.

More advanced embodiments can include the signalling of additional parameters. For example:

The levels of more than two of the quantisation thresholds could be signalled to the mobile terminals, together with an indicator of the number of quantisation thresholds (or bands), or the quantisation threshold spacing, between each of the signalled thresholds.

More advanced functions of the quantisation threshold spacing could also be signalled between one or more pairs of the signalled quantisation thresholds. For example, the gradient of the quantisation threshold spacing could be signalled, or the coefficients of a polynomial function of the quantisation threshold spacing.

Figure 4:
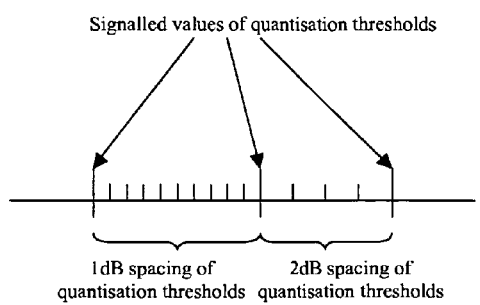
FIG. 4 illustrates another example of quantisation thresholds.

A further example is shown in FIG. 4, where the values of three quantisation thresholds are signalled to the mobile terminals, together with indicators that a 1 dB spacing should be used for the quantisation thresholds between the first and second signalled quantisation thresholds and a 2 dB spacing should be used for the quantisation thresholds between the second and third signalled quantisation thresholds.

The quantisation parameter selection shown in FIG. 4 can, for example, take into account the fact that it may be desirable, in the case of CQI reporting, to report CQI values more accurately at low values of SINR (signal to interference and noise ratio) than at higher values.

Thus the exact choice of quantisation parameters can be based on a combination of the aim of randomising the transmitted data values to minimise collision probability, and consideration of the effect of higher or lower degrees of accuracy in the data values.

The quantisation parameter(s) may be selected according to the deployment scenario (e.g. indoor, outdoor or macro/pico cell), or current traffic conditions.

The invention may also be applied to other kinds of information than CQI (including further channel state metrics). For example:

Channel transfer function
CQI for more than one frequency or frequency band
CQI for more than one antenna
Average CQI for more than one antenna
Different CQI between antennas
Location of the UE
Angle of the path from the UE to the access point
Required data rate The signalling of quantisation parameters may be configurable (e.g. only applied under high loading conditions, when collisions are more likely).

The signalling of the quantisation parameters may be updated according to measurements of the PDF of data received in actual preambles.

The quantisation parameter(s) may be derived dependent on, for example:

CQI reports transmitted on different channels
current cell size
handover measurements In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and which may be used instead of or in addition to features already described herein.

INDUSTRIAL APPLICABILITY

Wireless communication systems, for example UMTS LTE or other cellular systems such as UMTS WCDMA (Wideband Code Division Multiple Access).

The invention claimed is:

1. A method of operating a radio communication station in a radio communication system having a plurality of radio communication devices, comprising the act of:
    deriving a quantization parameter;
    deriving a characteristic of the radio communication system from signals received on a random access channel from a plurality of radio communication devices;
    deriving the quantization parameter dependent on the characteristic of the radio communication system; and
    transmitting the quantization parameter to the radio communication devices for use in subsequent quantization of a channel state metric, wherein the signals received on the random access channel each convey a data value indicative of a quantized channel state metric of the respective radio communication device; and
    deriving the data values from the signals received on the random access channel,
    wherein deriving the quantization parameter dependent on the characteristic of the radio communication system comprises deriving the quantization parameter dependent on the data values.

2. The method as claimed in claim 1, wherein deriving the quantization parameter comprises determining the quantization parameter dependent on a frequency of occurrence of different data values.

3. The method as claimed in claim 2, wherein the quantization parameter is adjusted to reduce the frequency of occurrence of the most frequently occurring data values.

4. The method as claimed in claim 1, wherein different sets of data values are conveyed by different time and/or frequency resource slots.

5. The method as claimed in claim 1, wherein the quantization parameter is indicative of a threshold.

6. The method as claimed in claim 1, wherein the quantization parameter is indicative of quantization ranges at least some of which have unequal width.

7. A method of operating a communication system having a plurality of radio communication devices comprising the steps of:
    deriving a quantization parameter;
    transmitting the quantization parameter to the radio communication devices for use in subsequent quantization of a channel state metric;
    receiving the quantization parameter;
    determining the channel state metric;
    quantizing the determined channel state metric by applying quantization ranges indicated by the quantization parameter;
    determining a data value indicative of the quantized channel state metric; and
    transmitting a signal conveying the determined data value as a random access transmission.

* * * * *